(12) United States Patent
Steiner et al.

(10) Patent No.: US 10,291,329 B2
(45) Date of Patent: May 14, 2019

(54) EXCHANGING INFORMATION BETWEEN TIME-OF-FLIGHT RANGING DEVICES

(71) Applicant: Infineon Technologies AG, Neubiberg (DE)

(72) Inventors: Christoph Steiner, St. Margarethen (AT); Robert Lobnik, Bad Eisenkappel (AT)

(73) Assignee: Infineon Technologies AG, Neubiberg (DE)

( * ) Notice: Subject to any disclaimer, the term of this patent is extended or adjusted under 35 U.S.C. 154(b) by 65 days.

(21) Appl. No.: 14/136,257

(22) Filed: Dec. 20, 2013

(65) Prior Publication Data

US 2015/0180581 A1  Jun. 25, 2015

(51) Int. Cl.
| | |
|---|---|
| *H04N 13/204* | (2018.01) |
| *H04B 10/11* | (2013.01) |
| *H04B 10/556* | (2013.01) |
| *G01S 17/87* | (2006.01) |
| *G01S 17/89* | (2006.01) |
| *G01S 7/00* | (2006.01) |
| *G01S 7/484* | (2006.01) |
| *G01S 11/12* | (2006.01) |

(52) U.S. Cl.
CPC .......... *H04B 10/5561* (2013.01); *G01S 7/006* (2013.01); *G01S 7/484* (2013.01); *G01S 11/12* (2013.01); *G01S 17/87* (2013.01); *G01S 17/89* (2013.01)

(58) Field of Classification Search
USPC ................ 398/138, 153, 162, 161, 172, 188
See application file for complete search history.

(56) References Cited

U.S. PATENT DOCUMENTS

| | | | | |
|---|---|---|---|---|
| 5,920,288 A | * | 7/1999 | Sorrells | ..................... G01S 5/14 342/465 |
| 6,323,980 B1 | * | 11/2001 | Bloom | ............... H04B 10/1125 398/116 |
| 6,826,371 B1 | * | 11/2004 | Bauch | ..................... H04L 27/18 398/183 |

(Continued)

FOREIGN PATENT DOCUMENTS

| | | |
|---|---|---|
| DE | 202007017639 U1 | 3/2008 |
| EP | 2595402 A2 | 5/2013 |

OTHER PUBLICATIONS

Electrofriends, "DPSK Modulation and Demodulation", Jun. 2009, All Pages.*

(Continued)

*Primary Examiner* — Shi K Li
*Assistant Examiner* — Pranesh K Barua
(74) *Attorney, Agent, or Firm* — Eschweiler & Potashnik, LLC

(57) ABSTRACT

Embodiments address a concept for exchanging information between time-of-flight ranging devices. For example, a first time-of-flight camera has an illumination unit configured to transmit information to a second time-of-flight camera by modulating a light signal to be emitted in accordance with an information bearing signal. The second time-of-flight camera has a time-of-flight sensor configured to detect the information bearing signal included in the emitted light signal of the first time of flight camera.

18 Claims, 4 Drawing Sheets

(56) References Cited

U.S. PATENT DOCUMENTS

| | | | | |
|---|---|---|---|---|
| 7,012,738 B1* | 3/2006 | Schwarte | | G02F 2/002 356/337 |
| 7,248,802 B2* | 7/2007 | Grohn | | H04B 10/0771 370/503 |
| 7,949,259 B2* | 5/2011 | Suzuki | | H04B 10/116 398/172 |
| 8,340,402 B2* | 12/2012 | Schmitt | | G01S 17/00 382/154 |
| 8,953,647 B1* | 2/2015 | Mead | | H01S 3/06754 372/6 |
| 2002/0126340 A1* | 9/2002 | Nikiforov | | H04B 10/11 398/41 |
| 2003/0133018 A1* | 7/2003 | Ziemkowski | | H04N 5/2256 348/211.2 |
| 2003/0147652 A1* | 8/2003 | Green | | H04Q 11/0005 398/118 |
| 2004/0259499 A1* | 12/2004 | Oba | | H04M 1/7253 455/41.2 |
| 2005/0248776 A1* | 11/2005 | Ogino | | H04N 1/00129 358/1.2 |
| 2006/0050877 A1* | 3/2006 | Nakamura | | G06F 21/445 380/46 |
| 2006/0139314 A1* | 6/2006 | Bell | | A63F 13/02 345/156 |
| 2007/0030841 A1* | 2/2007 | Lee | | G01S 5/0027 370/352 |
| 2007/0092264 A1* | 4/2007 | Suzuki | | H04B 10/1141 398/189 |
| 2007/0223938 A1* | 9/2007 | Gervais | | H04B 10/677 398/188 |
| 2007/0252901 A1* | 11/2007 | Yokonuma | | H04N 1/00347 348/231.1 |
| 2008/0131140 A1* | 6/2008 | Shin | | H04B 10/1143 398/172 |
| 2009/0022112 A1* | 1/2009 | Shin | | H04B 10/1149 370/336 |
| 2009/0022498 A1 | 1/2009 | Shibutani | | |
| 2009/0142068 A1* | 6/2009 | Takahashi | | H04B 10/1149 398/140 |
| 2009/0214203 A1* | 8/2009 | Hoshida | | H04B 10/67 398/33 |
| 2009/0269073 A1* | 10/2009 | Kitaji | | H04B 10/1149 398/130 |
| 2010/0054748 A1* | 3/2010 | Sato | | H04B 10/1149 398/130 |
| 2010/0118122 A1* | 5/2010 | Hartman | | H04N 13/128 348/46 |
| 2010/0209118 A1* | 8/2010 | Takene | | H04B 10/1141 398/182 |
| 2010/0247112 A1* | 9/2010 | Chang | | H04B 10/1149 398/182 |
| 2010/0295940 A1* | 11/2010 | Schwarte | | G01B 11/026 348/135 |
| 2011/0001799 A1* | 1/2011 | Rothenberger | | G06K 9/00771 348/47 |
| 2011/0025843 A1* | 2/2011 | Oggier | | G01S 7/4814 348/135 |
| 2011/0052216 A1* | 3/2011 | Jiang | | H04B 10/25133 398/208 |
| 2011/0188028 A1* | 8/2011 | Hui | | G01C 3/08 356/5.01 |
| 2011/0205521 A1* | 8/2011 | Mimeault | | G01S 7/4814 356/4.01 |
| 2011/0254928 A1* | 10/2011 | Meinherz | | G01B 11/22 348/46 |
| 2011/0274429 A1* | 11/2011 | Caplan | | H04B 10/5561 398/65 |
| 2011/0305370 A1* | 12/2011 | Choi | | G06T 7/55 382/106 |
| 2012/0026488 A1* | 2/2012 | Piech | | G02B 6/4225 356/139.05 |
| 2012/0098964 A1* | 4/2012 | Oggier | | G01S 17/89 348/140 |
| 2012/0140203 A1* | 6/2012 | Gusev | | G01S 7/489 356/5.01 |
| 2012/0146834 A1* | 6/2012 | Karr | | G01S 13/325 342/47 |
| 2012/0157159 A1* | 6/2012 | Jang | | H04B 10/116 455/556.1 |
| 2012/0176476 A1* | 7/2012 | Schmidt | | G01S 17/89 348/46 |
| 2012/0229646 A1* | 9/2012 | Grandidier | | G06K 9/00201 348/149 |
| 2012/0263078 A1* | 10/2012 | Tung | | H04B 7/15564 370/277 |
| 2012/0269520 A1* | 10/2012 | Hong | | H01L 25/167 398/172 |
| 2013/0088941 A1 | 4/2013 | Elian et al. | | |
| 2013/0131836 A1* | 5/2013 | Katz | | H04N 21/422 700/12 |
| 2013/0162330 A1 | 6/2013 | Kautzsch | | |
| 2013/0177322 A1* | 7/2013 | DeVaul | | H04B 7/18504 398/131 |
| 2013/0208027 A1* | 8/2013 | Bae | | G09G 3/3426 345/690 |
| 2013/0208258 A1* | 8/2013 | Eisele | | G01S 7/4913 356/5.01 |
| 2013/0236183 A1* | 9/2013 | Chao | | H04B 10/116 398/101 |
| 2013/0247117 A1* | 9/2013 | Yamada | | G08C 17/02 725/93 |
| 2013/0251374 A1* | 9/2013 | Chen | | H04B 10/1141 398/118 |
| 2013/0266325 A1* | 10/2013 | Giustiniano | | H04B 10/116 398/130 |
| 2013/0307933 A1* | 11/2013 | Znamenskiy | | H04N 13/20 348/46 |
| 2014/0010554 A1* | 1/2014 | Midavaine | | G01S 5/16 398/154 |
| 2014/0016653 A1* | 1/2014 | Oh | | H04W 72/0406 370/474 |
| 2014/0152813 A1* | 6/2014 | Wilks | | G01S 17/36 348/138 |
| 2014/0253905 A1* | 9/2014 | Kim | | G01C 15/06 356/5.01 |
| 2014/0267725 A1* | 9/2014 | Smith | | H04N 7/18 348/148 |
| 2014/0300907 A1* | 10/2014 | Kimmel | | A41H 1/02 356/625 |
| 2014/0313376 A1* | 10/2014 | Van Nieuwenhove | | G01S 17/89 348/241 |
| 2015/0001664 A1* | 1/2015 | Van Der Tempel | | H01L 27/14612 257/432 |
| 2015/0042765 A1* | 2/2015 | Pfister | | B60R 1/002 348/48 |
| 2015/0078743 A1* | 3/2015 | Yang | | H04B 10/116 398/38 |
| 2015/0085274 A1* | 3/2015 | Bichlmeier | | G01B 11/275 356/5.01 |
| 2015/0116585 A1* | 4/2015 | Damhofer | | G01S 17/89 348/370 |
| 2015/0124240 A1* | 5/2015 | Wilks | | G01S 17/36 356/5.01 |

OTHER PUBLICATIONS

Dheeaj Sanghi, "Data Encoding", IIT University, Feb. 2008, All Pages.*

* cited by examiner

ET
EXCHANGING INFORMATION BETWEEN TIME-OF-FLIGHT RANGING DEVICES

TECHNICAL FIELD

Embodiments generally relate to the field of Time-of-Flight (ToF) ranging devices, such as ToF cameras, for example.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Time-of-flight (ToF) ranging is one of the most widely used techniques for optical 3-Dimensional (3D) measurement. ToF range imaging cameras may measure a distance to each pixel in a field of view of a ToF camera. This may be achieved by illuminating a scene with modulated light, for example infra-red light, and measuring a phase shift between an outgoing and incoming modulated light signal. For each pixel, the related distance may then be calculated from this phase shift. Hence, conventional ToF cameras may employ modulated light for illuminating a scene and its reflected version for determining depth information related to one or more objects in the scene.

SUMMARY

Some simplifications may be made in the following summary, which is intended to highlight and introduce some aspects of the various exemplary embodiments, but such simplifications are not intended to limit the scope of the invention(s). Detailed descriptions of a preferred exemplary embodiment adequate to allow those of ordinary skill in the art to make and use the inventive concepts will follow in later sections.

According to a first aspect, embodiments provide a Time-of-flight (ToF) camera. The ToF camera includes an illumination unit which is configured to transmit information to a remote receiver by modulating a light signal to be emitted in accordance with an information bearing signal.

In one or more embodiments the remote receiver may be a remote ToF receiver, for example included in a further remote ToF camera. In some embodiments the illumination unit may also be used for illuminating a scene to be captured by the ToF camera.

Embodiments also include a corresponding method. The method includes exchanging information between a ToF camera and a remote ToF receiver by modulating, at the ToF camera, a light signal to be emitted in accordance with an information bearing signal.

According to a further aspect, embodiments provide a ToF receiver including a ToF sensor which is configured to detect an information bearing signal included in a modulated light signal emitted from a remote light source.

In one or more embodiments the ToF receiver may be included in a ToF camera. In some embodiments the ToF sensor may be a ToF pixel, for example, a Photonic Mixing Device (PMD) pixel. In some embodiments the remote light source may be included in an illumination unit of a remote ToF camera.

Embodiments further include a corresponding method. The method includes, at a ToF receiver, detecting an information bearing signal included in a modulated light signal emitted from a remote light source. One or more conventional ToF pixels may be used for this purpose.

Embodiments also comprise a system including a first and a second ToF camera. The first ToF camera has an illumination unit configured to transmit information to a second ToF camera by modulating a light signal to be emitted in accordance with an information bearing signal. The second ToF camera has a ToF sensor configured to detect the information bearing signal included the emitted light signal of the first ToF camera. Therewith a plurality of ToF cameras may be enabled to communicate with each other.

Embodiments further include a method for exchanging information between a first and a second ToF camera. The method comprises modulating a light signal to be emitted from the first ToF camera in accordance with an information bearing signal, and detecting, with the second ToF camera, the information bearing signal included the emitted light signal of the first ToF camera.

Some embodiments comprise digital circuitry installed within a ToF camera for performing the respective method. Such a digital control circuitry, e.g., a Digital Signal Processor (DSP), a Field-Programmable Gate Array (FPGA), an Application-Specific Integrated Circuit (ASIC), or a general purpose processor, needs to be programmed accordingly. Hence, yet further embodiments also provide a computer program having a program code for performing embodiments of one of the above methods or at least one or more steps thereof, when the computer program is executed on a computer or a programmable hardware device.

Embodiments may combine 3D imaging and data exchange on 3D ToF cameras.

BRIEF DESCRIPTION OF THE FIGURES

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
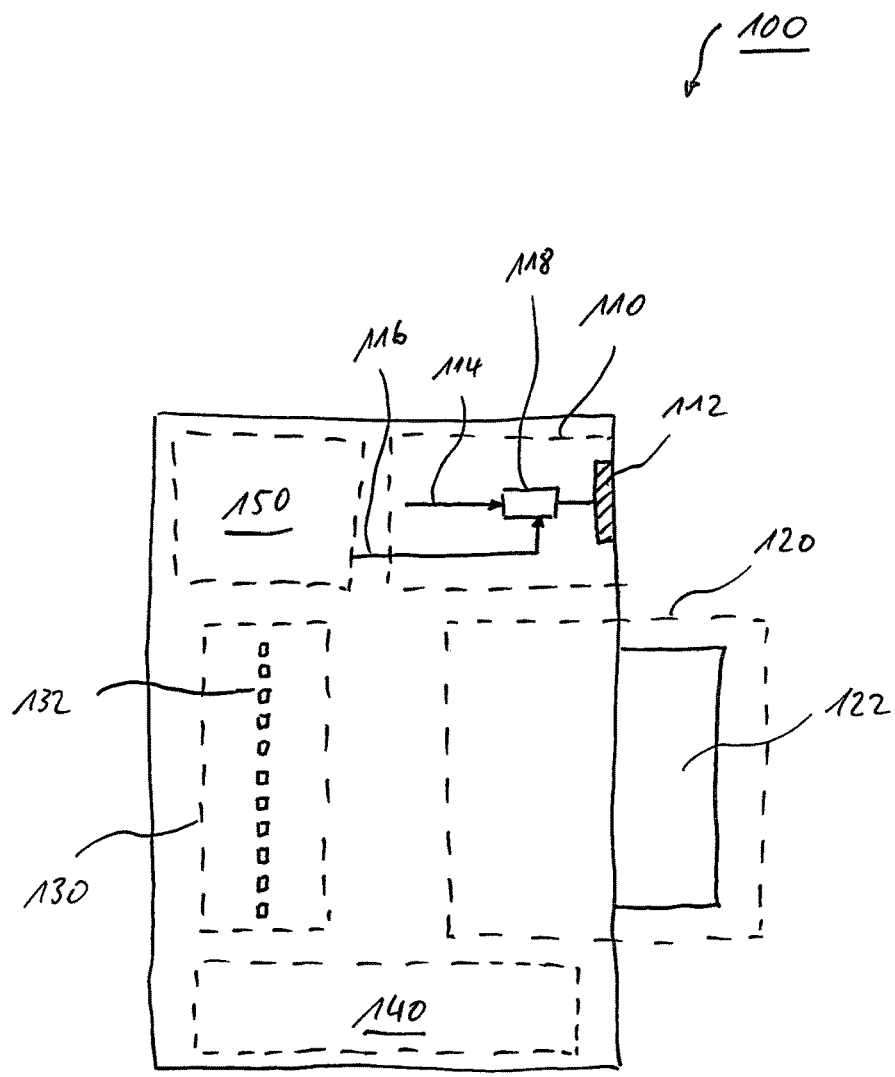
FIG. 1 shows a ToF camera according to an embodiment.

FIG. 1 illustrates a schematic block diagram of a Time-of-Flight (ToF) camera 100 according to an embodiment.

The ToF camera 100 may be regarded as an example for a range imaging device that resolves distance based on the known speed of light and by measuring the time-of-flight of a light signal between the camera 100 and an object for each point of the camera's field of view. The ToF camera 100 may be a stand-alone ToF camera or may be included in another device, such as a smartphone, a tablet PC, a laptop PC, or the like. According to embodiments, the ToF camera 100 may at the same time communicate with other ToF devices, for example.

The ToF camera 100 comprises an illumination unit 110 including a light emitter 112, an optics assembly 120, an image sensor 130, driver circuitry 140, and a processor unit 150. According to embodiments, the illumination unit 110 or, more particularly, its light emitter 112 is configured to exchange/communicate information with/to a remote receiver (not shown) by modulating light or a light signal 114 to be emitted in accordance with an information bearing signal 116.

Thereby, at least a portion of the information bearing signal 116 may be non-predetermined, i.e., not known a priori, and may depend on actual information that shall be transmitted from the camera 100 to the remote or distant receiver. The information bearing signal 116 may hence carry useful information to be transmitted from the ToF camera 100 to the remote receiver, which may be a remote ToF ranging device or receiver, such as a further ToF camera in some embodiments. However, ToF receivers in other devices, such as smartphones, tablet PCs, laptop PCs, or the like, are also possible.

In some embodiments the information bearing signal may comprise one or more non-predetermined digital baseband signals for conveying useful information to the remote receiver. For example, the information bearing signal 116 may comprise information on a picture captured by the camera 100 and/or 3D information thereof. For another example, the information bearing signal 116 may comprise information on the camera 100, such as configuration information of the camera. Thereby the configuration information may include predefined and camera-specific modulation sequences for modulating the emitted light 114. By communicating its camera-specific modulation sequence to other ToF cameras, the latter may choose other orthogonal modulation sequences to reduce mutual interference among the multiple 3D cameras in vicinity to each other.

In some embodiments a modulator 118 of the illumination unit 110 may be configured to modulate a phase of the light signal 114 in accordance with the information bearing signal 116. Hence, the modulator 118 may be configured to perform phase modulation of the light signal 114. Alternatively or additionally the amplitude of the light signal 114 may also be modulated based on the information bearing signal 116.

In some embodiments the modulator 118 may be configured to modulate the light 114 in accordance with a non-coherent modulation scheme. In this way, the transmitting ToF camera 100 and the remote receiver do not need to be phase synchronized to detect the information bearing signal, which may lead to less complex implementations. For example, the light signal 114 may be modulated in accordance with a differential modulation scheme, such as Differential Phase Shift-Keying (DPSK). Here, data of the information bearing signal may be used to change rather than set the phase of the light 114 to be emitted.

It will be appreciated that in other embodiments also coherent transmission or modulation schemes may be employed, such as Phase Shift Keying (PSK) or Quadrature Amplitude Modulation (QAM) schemes, for example. In such cases the information bearing signal 116 may be supplemented with a predefined synchronization or training signal to enable the remote receiver to estimate and synchronize to the phase of the emitted modulated light signal. Coherent transmission/reception schemes may allow for detecting both an unknown transmitted information bearing signal 116 as well as a distance between a transmitting device and a remote receiving device.

Besides exchanging information, the illumination unit 110 may also be configured to illuminate a scene to be captured by the time-of-flight camera 100. Hence, the light emitter 112 may be configured to wirelessly, i.e. without cables or fiber, emit the light 114 toward the scene and/or the remote receiver, which should be in the field of view of the illumination unit 110 in order to be able to receive the modulated light 114. As the light 114 may be modulated with speeds of several to hundreds of MHz, for example, Light-Emitting Diodes (LEDs) or laser diodes may form the light emitter 112. The illumination unit 110 may use infrared light to make the illumination unobtrusive. Hence, the light signal 114 may be an infrared light signal covering wavelengths from 430 THz down to 300 GHz, corresponding to wavelengths of 700 nm to 1 mm.

The optics assembly 120 may comprise one or more lenses 122 to gather reflected light and to image the captured scene/environment onto the image sensor 130. The optics assembly 120 may further comprise one or more optical band-pass filters to pass light with the same wavelength as the light emitted from the illumination unit 110. Optical band-pass filters may help to suppress undesired background light.

The image sensor 130 may comprise one or more depth-sensitive pixels 132 to capture at least a part of a scene in the half space in front of the time-of-flight camera 100. The depth-sensitive pixels may be configured to measure the time the light 114 has taken to travel from the illumination unit 110, hence from the camera 100, to an illuminated object and back. Hence, the depth-sensitive pixels 132 of the image sensor 130 may be regarded as ToF sensors, respectively, and the image sensor 130 may be regarded as a ToF receiver. Other ToF receivers which are not embedded in a ToF camera are also conceivable. Examples of ToF sensors include Photonic Mixing Device (PMD) pixels to receive the modulated light signal. As the skilled person having benefit from the present disclosure will appreciate, a PMD pixel is a surface channel semiconductor device which can perform simultaneous mixing and charge integration procedure in its photosensitive area. A PMD pixel may be manufactured in line with conventional Complementary Metal-Oxide-Semiconductor (CMOS) semiconductor technologies.

In some embodiments one or more ToF pixels/detectors 132 of the image sensor 130 may alternatively or additionally be configured to detect an information bearing signal included in a light signal emitted from a remote ToF camera (not shown) and captured by the ToF camera 100. Depending on the underlying modulation scheme the information bearing signal may be detected based on coherent or non-coherent detection schemes. While for coherent detection schemes phase synchronization between emitted/transmitted light signal and received light signal are required, phase synchronization is not necessary for non-coherent detection schemes, such as DPSK, for example.

Both the illumination unit 110 and the image sensor 130 of the ToF camera 100 may be controlled by high speed signals delivered from the driver circuitry 140. Such signals may be very accurate to obtain a high resolution. For example, if the signals between the illumination unit 110 and the sensor 130 shift by only 10 picoseconds, the detected distance may change by 1.5 mm. The distance and/or the estimate of the received information bearing signal may be determined by means of the processor unit 150, for example.

Figure 2:
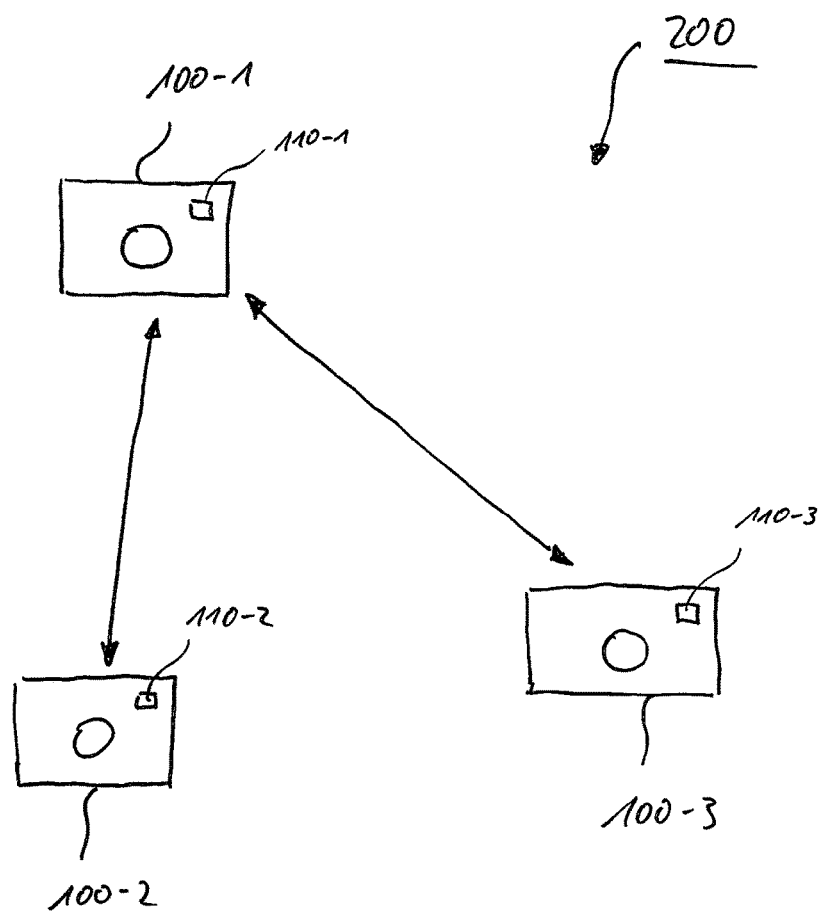
FIG. 2 shows system of multiple ToF cameras according to an embodiment.

Turning now to FIG. 2, it is schematically illustrated a communication system 200 comprising a plurality of ToF cameras 100-1, 100-2, 100-3. According to embodiments the plurality of ToF cameras 100-1, 100-2, 100-3 may mutually exchange information.

As has been explained before, a first ToF camera 100-1 has an illumination unit 110-1 configured to exchange information with or transmit information to a second ToF camera 100-2 or 100-3 by modulating a light signal to be emitted in accordance with an information bearing signal. The second ToF camera 100-2 or 100-3 has one or more ToF sensors configured to detect the information bearing signal included the emitted light signal of the first ToF camera 100-1. It will be appreciated by the skilled person that the communication between the ToF cameras 100-1, 100-2, 100-3 may be bidirectional, respectively. Hence, each of the ToF cameras 100-1, 100-2, 100-3 may include both optical transmitter as well as optical receiver circuitry, as has been explained before. Note that also other ToF devices, which do not necessarily need to be ToF cameras, may take part in the communication system 200.

Hence, embodiments may support data communication among different 3D cameras, for example. The cameras may broadcast their own configuration data periodically, for example. Other cameras may receive these parameters and gather awareness of their environment, for example, how many other cameras are in the vicinity and/or what configuration are they using. With this information about other users each camera may adapt/optimize its own configuration, for example its modulation frequency and/or sequence, to the environment. Some embodiments may hence dynamically reduce illumination interference between different ToF cameras employed in vicinity to each other.

Figure 3:
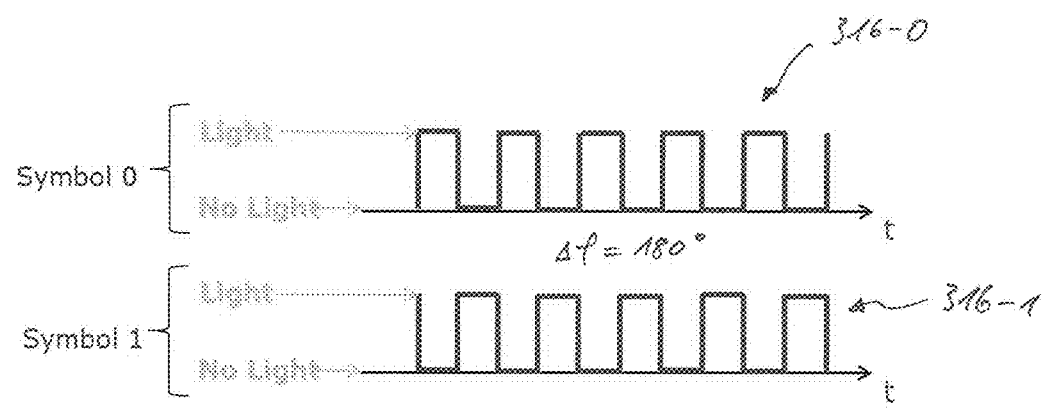
FIG. 3 shows an example of an information bearing signal.

FIG. 3 illustrates an example of how an information symbol of an information bearing signal 116 may modulate a light signal to be emitted.

FIG. 3 exemplarily shows a binary symbol alphabet {0; 1} only for illustrative purposes. The skilled person will appreciate that also higher order M-ary symbol alphabets and modulation schemes are covered by embodiments, where M>2. For information symbol "0" as well as for information symbol "1" the emitted light signal, which may be Near-InfraRed (NIR) light, may be of rectangular shape, resulting in a first periodic sequence 316-0 and a second periodic sequence 316-1 of light pulses. Hence, the information bearing signal may comprise a first binary signal sequence 316-0 in accordance with a first information symbol and a different second binary signal sequence 316-1 in accordance with a different second information symbol. A difference between the first sequence 316-0 belonging to symbol "0" and the second sequence 316-1 belonging symbol "1" may be a predetermined phase shift of the emitted light sequences, for example a phase shift $\Delta\varphi=180°$. Hence, a phase of the light signal may be modulated in accordance with the information bearing signal.

Figure 4A:
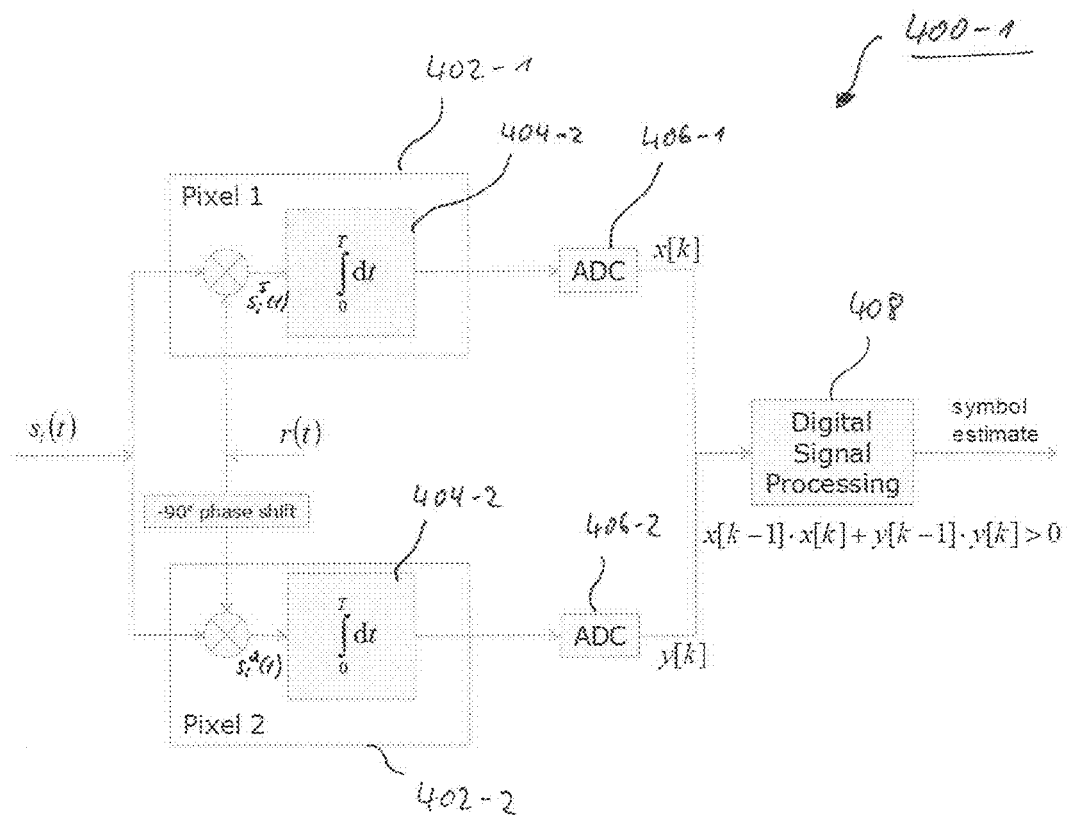
FIGS. 4a, b show example implementations of detection circuitry for an information bearing signal.
Figure 4B:
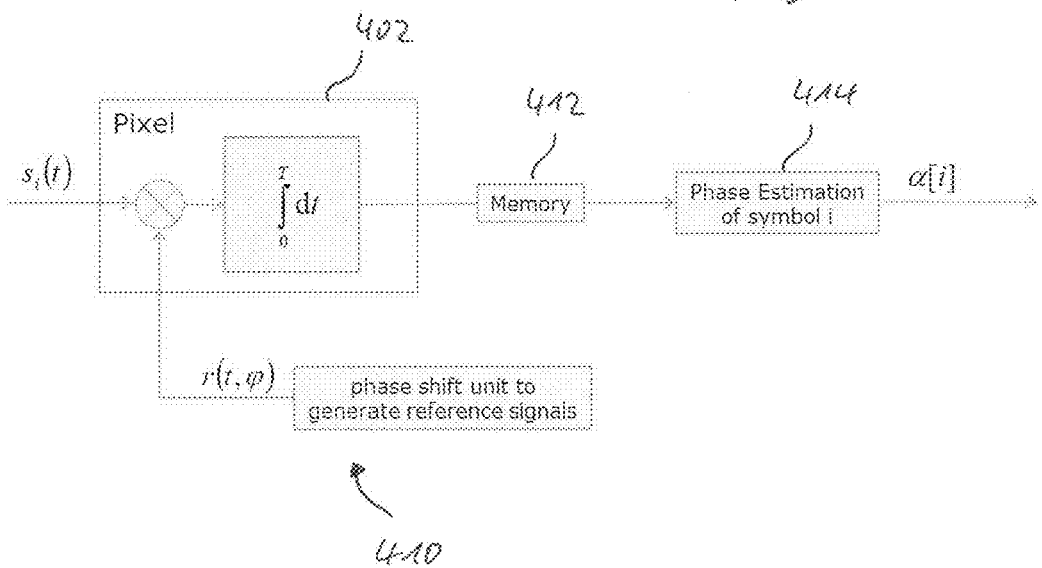

In the example embodiment of FIG. 3 each information symbol {0; 1} comprises several periods of a periodic signal sequence 316-0, 316-1. As will be explained below, a remote receiver may integrate over these periods to reach a sufficient Signal-to-Noise (SNR). Although FIG. 3 exemplarily illustrates rectangular signal sequences 316-0, 316-1, the skilled person will appreciate that other signal forms, e.g. sinusoidal signal forms, may also apply. At a distant receiving side, for example a distant ToF camera, ToF pixels may be designed to detect the phase shift between a received signal and a reference signal, as illustrated in FIGS. 4a and 4b. Conventionally this phase shift depends on a distance to an illuminated target. In case of data communication, however, the transmitter and receiver may be two distinct and distributed ToF cameras, which may not have the same phase and clock reference (non-coherent detection). In some embodiments transmitter and receiver may however be symbol-synchronized. Such symbol synchronization may be achieved by detecting large phase jumps, for example, or by inserting known training symbols to an information bearing signal 116, for example.

FIG. 4a schematically illustrates an exemplary transmission/reception scheme in form of non-coherent orthogonal signaling via Differential Phase-Shift Keying (DPSK). Here, a demodulator 400-1 may determine changes in the phase of the received signal rather than the phase (relative to a reference wave) itself. There is no need for the demodulator 400-1 to have a copy of the emitted/transmitted light signal to determine the exact phase of the received signal, it is a non-coherent scheme.

For example, the optical or light signal 114 for transmitting information symbol "0" may be encoded without phase shift according to $$s_0(t) = \begin{cases} \cos(2\pi ft), & \ldots 0 < t < T \\ \cos(2\pi ft), & \ldots T < t < 2T \end{cases}.$$

The optical signal for transmitting symbol "1" may then be encoded with a phase shift according to $$s_1(t) = \begin{cases} \cos(2\pi ft), & \ldots 0 < t < T \\ \cos(2\pi ft + \pi), & \ldots T < t < 2T \end{cases}.$$

Instead of the cosine waveform any other periodic waveform, like rectangular, can be used, as has been explained before. The variable f denotes a modulation frequency of the optical signal and the variable T denotes the symbol duration or integration time of a corresponding receiver. Typically T may be an integer multiple of 1/f.

FIG. 4a shows a schematic block diagram of a DPSK detector/demodulator 400-1 for an information bearing signal included in a received optical or light signal $s_i(t)$, where i denotes the transmitted symbol. The example detector 400-1 comprises a first PMD pixel 402-1 and a second PMD pixel 402-2. Both PMD pixels 402-1, 402-2 are coupled to a reference signal source for down-converting (down-mixing) the received light signal $s_i(t)$ to a lower frequency domain, such as the baseband domain for example, using a reference signal $r(t)=\cos(2\pi ft)$. Thereby PMD pixel 402-2 uses a −90° phase shifted version of the reference signal r(t), which yields $\sin(2\pi ft)$ in our example, for down-converting the received light signal $s_i(t)$. Note, that a phase of the reference signal r(t) and the emitted light signal do not necessarily have to be aligned for non-coherent detection schemes. However, the reference signal source or unit may be configured to adjust a phase of the reference signal r(t) based on a predefined synchronization or training signal included in the signal $s_i(t)$.

The mixing process in both PMD pixels 402-1, 402-2 may yield baseband signals $s_i^I(t)$ and $s_i^Q(t)$, respectively. The baseband signals $s_i^I(t)$ and $s_i^Q(t)$ may be integrated by integrators 404-1, 404-2 for a symbol duration T, respectively. The integrators 404-1, 404-2 may be comprised by the PMD pixels 402-1, 402-2, respectively. The outputs of the integrators 404-1, 404-2 may then be converted from analog to digital by Analog-to-Digital Converters (ADCs) 406-1, 406-2, respectively, to yield digital samples x[k] and y[k], where k is the sampling index. Using the digital Inphase (I) samples x[k] and Quadrature (Q) samples y[k] some well-known differential digital signal processing 408 on x[k−1], x[k], y[k−1] and y[k] may be performed in order to arrive at the information symbol estimate for symbol i. While the embodiment of FIG. 4a, which generates I and Q components for a received signal, may be particularly beneficial for higher order modulation schemes, FIG. 4b shows a less complex receiver setup 400-2 employing only one pixel 402 instead of two.

FIG. 4b shows a schematic block diagram of another implementation of a PSK detector/demodulator 400-2 for an information bearing signal included in a received optical or light signal $s_i(t)$, where i denotes the transmitted symbol. The example detector 400-2 comprises only one PMD pixel 402, which is coupled to a reference signal source 410 for down-converting (down-mixing) the received light signal $s_i(t)$ to a lower frequency domain, such as the baseband domain for example, using a plurality of reference signals $r_n(t, \varphi_n)$ with different phases $\varphi_n$. For example, four reference signals with four phase shifts of $\varphi_1=0°$, $\varphi_2=90°$, $\varphi_3=180°$, and $\varphi_4=270°$ may be applied sequentially. During this time the information symbol should not change. Hence, if the symbol duration is T, the time of application of a reference signals $r_n(t, \varphi_n)$ is T/N, where N is the number of different phase shifts (here in this example N=4). At the output of the pixel 402 we have a sequence of four values A0, A1, A2, A3, which may be stored in memory 412. These four values may be used to calculate 414 the actual phase of symbol i, i.e., α[i] via the equation $$\alpha[i] = \arctan\left(\frac{A_1 - A_3}{A_2 - A_0}\right).$$

The person skilled in the art will certainly appreciate that a ToF camera may also employ more than one ToF sensor 132 for receiving an information bearing signal, leading to so-called optical Single-Input Multiple-Output (SIMO) concepts. If a transmitting ToF camera employs more than one light emitter 112, optical Multiple-Input Multiple-Output (MIMO) transmission scenarios may arise, which may be beneficial for high-speed data communication and/or in obstructed environments, for example.

To summarize, embodiments suggest using ToF pixels, which conventionally serve the purpose of distance estimation (3D imaging), also for data reception. Data transmission and/or reception capabilities may come without additional hardware costs. Data transmission may be accomplished by proper modulation of the emitted light. Embodiments may combine 3D imaging and data transmission on a 3D camera. The data reception and distance estimation may be accomplished by standard ToF pixels. The data transmission may be accomplished by modulating the emitted infrared light.

Embodiments may support data communication among different 3D cameras. Hence, each camera can broadcast its own configuration data periodically, for example. Other cameras may receive these parameters and gather awareness of environment (e.g. how many other cameras are in the vicinity? what configuration are they using? etc.). With this information about other users each camera can adapt/optimize its own configuration (e.g. modulation frequency) to the environment.

Embodiments may be relevant for applications like remote configuration, remote control, self-organization of PC/Laptop/TV/home stereo, etc.

Embodiments suggest a novel receiver design for optical data transmission with many benefits as compared to state-of-the-art solutions. A correlation function may be directly implemented in the optical active area (ToF pixel).

Embodiments allow for joint data communication and distance estimation. This may enable distance bounding protocols in order to avoid wormhole attacks. Distance bounding protocols are cryptographic protocols that enable a verifier V to establish an upper bound on a physical distance to a prover P. They are based on timing a delay between sending out challenge bits and receiving back corresponding response bits. The delay time for responses enables V to compute an upper-bound on the distance, as the round trip delay time divided into twice the speed of light. The computation is based on the fact that electro-magnetic waves travel nearly at the speed of light, but cannot travel faster. For example, secure Near field Communication (NFC) may be enabled (e.g., only if distance is less than 1 cm, communication is allowed).

It will be appreciated that the described apparatuses may perform corresponding methods.

Example embodiments may further provide a computer program having a program code for performing one of the related methods, when the computer program is executed on a computer or processor. A person of skill in the art would readily recognize that steps of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "units for . . . " (performing a certain function) shall be understood as functional blocks comprising circuitry that is configured to perform a certain function, respectively. Hence, a "unit for s.th." may as well be understood as a "unit configured to or suited for s.th.". A unit configured to perform a certain function does, hence, not imply that such means necessarily is performing the function (at a given time instant).

Functions of various elements shown in the figures, including any functional blocks may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that —although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A time-of-flight camera, comprising:
an illumination unit configured to illuminate a scene to be captured and transmit information to a remote time-of-flight camera by modulating a phase of a light signal to be emitted from a light source in accordance with an information bearing signal;
a detector comprising at least one Photonic Mixing Device (PMD) pixel, the detector configured to detect a further information bearing signal included in a phase modulated light signal emitted from the remote time-of-flight camera, to measure the time the light signal has taken to travel from the illumination unit to an object of the scene and to the detector to determine a distance to the object; and
wherein the illumination unit is configured to modulate the light signal with a first periodic signal sequence in accordance with a first information symbol of the information bearing signal and with a second periodic signal sequence in accordance with a second information symbol of the information bearing signal
wherein the further information bearing signal includes one or more periodic sequences for one or more symbols and the detector is configured to integrate a plurality of the one or more periodic sequences to reach a suitable signal-to-noise ratio (SNR).

2. The time-of-flight camera of claim 1, wherein the information bearing signal comprises a non-predetermined baseband signal conveying useful information for the remote time-of-flight sensor.

3. The time-of-flight camera of claim 1, wherein the first periodic signal sequence and the second periodic signal sequence are phase-shifted by a predetermined value.

4. The time-of-flight camera of claim 1, wherein the illumination unit is configured to modulate the light signal in accordance with a non-coherent modulation scheme.

5. The time-of-flight camera of claim 1, wherein the illumination unit is configured to modulate the light signal in accordance with a differential modulation scheme.

6. The time-of-flight camera of claim 1, wherein the illumination unit is configured to modulate the light signal in accordance with a Differential Phase Shift-Keying (DPSK) modulation scheme.

7. The time-of-flight camera of claim 1, wherein information bearing signal comprises a predefined synchronization signal to enable the remote time-of-flight sensor to synchronize to a phase of the emitted light signal.

8. The time-of-flight camera of claim 1, wherein the illumination unit is configured to wirelessly emit the light signal to the remote time-of-flight receiver.

9. The time-of-flight camera of claim 1, wherein the light signal is an infra-red light signal.

10. The time-of-flight camera of claim 1, wherein the detector is configured to also capture at least a part of a scene to be captured by the time-of-flight camera.

11. The time-of-flight camera of claim 1, wherein the detector is configured to detect the further information bearing signal based on a non-coherent detection scheme.

12. The time-of-flight camera of claim 1, wherein the PMD pixel is coupled to a reference signal unit to downconvert the received modulated light signal to baseband domain using a reference signal.

13. The time-of-flight camera of claim 12, wherein the reference signal unit is configured to adjust a phase of the reference signal based on a predefined synchronization signal included in the further information bearing signal.

14. The time-of-flight camera of claim 1, wherein the illumination unit is configured to illuminate a scene to be captured by the time-of-flight camera with the light signal.

15. The time-of-flight camera of claim 1, wherein the information bearing signal includes camera configuration information.

16. A time-of-flight receiver, comprising:
a time-of-flight sensor comprising at least one Photonic Mixing Device (PMD) pixel configured to detect an information bearing signal included in a light signal emitted from a remote light source, wherein a phase of the light signal is modulated in accordance with the information bearing signal, and the PMD pixel is configured to integrate one or more periodic sequences of the information bearing signal to reach a suitable signal-to-noise ratio (SNR); and
wherein the remote light source is configured to modulate the light signal with a first periodic signal sequence in accordance with a first information symbol of the information bearing signal and with a second periodic signal sequence in accordance with a second information symbol of the information bearing signal.

17. The time-of-flight receiver of claim 16, wherein the time-of-flight receiver is included in a time-of-flight camera and/or wherein the information bearing signal comprises useful information from a remote time of flight camera.

18. A system, comprising:
a first time-of-flight camera having an illumination unit configured to transmit information to a second time-of-flight camera by modulating a phase of a light signal to be emitted from a light source in accordance with an information bearing signal, wherein the illumination unit is configured to illuminate a scene to be captured by the time-of-flight camera with the light source;
the second time-of-flight camera having a time-of-flight sensor comprising at least one Photonic Mixing Device (PMD) pixel configured to detect the information bearing signal included in the emitted phase modulated light signal of the first time of flight camera and configured to integrate a plurality of periodic sequences to reach a suitable signal-to-noise ratio (SNR); and
wherein the illumination unit is configured to modulate the light signal with a first periodic signal sequence in accordance with a first information symbol of the information bearing signal and with a second periodic signal sequence in accordance with a second information symbol of the information bearing signal.

* * * * *